Patented Mar. 13, 1951

2,545,431

UNITED STATES PATENT OFFICE 2,545,431

METHOD OF KILLING WEEDS AND THE MATERIALS USED THEREIN

Paul A. Sartoretto, New York, N. Y., assignor to W. A. Cleary Corporation, a corporation of New Jersey No Drawing. Application March 21, 1947, Serial No. 736,412

18 Claims. (Cl. 71—2.4)

This invention relates to a method of killing weeds in an active state of growth and to the materials that are used in killing the weeds.

Various types of weed killers have been proposed and are now being used. These materials have a selective action in that they will kill weeds but will not harm the grass and other useful plants. I have discovered a more efficient weed killer that kills and inhibits the further growth of a greater variety of weeds than was true with former weed killing materials. The new weed killers of this invention are aryl mercury salts of 2,4-dichlorophenoxy acetic acid, 2,5-dichlorophenoxy acetic acid, and 2,4,5-trichlorophenoxy acetic acid. The new salts are reaction products of aryl mercury compounds and the above acids.

The new weed killing salts are used in a carrier. This carrier can be either a solvent, a water-soluble solvent for the salt and water, or an inert powder such as finely-divided clays, calcium carbonate, and the like. The water-soluble solvents for the salts may be alcohols, preferably the lower aliphatic alcohols, formamide, carbitol, and the like. The salts are preferably used in a concentration of about one part of the salt per 1,000 to 80,000 parts of a carrier. The stronger solutions may be used in a single treatment, but this is not recommended as it may kill all plant growths in the treated area. The preferred way of using the weed killers is to apply them at intervals to a given area under treatment. This destroys the weeds without harming the grass and prevents new growths of weeds. The weed killers may be applied in a concentration of ten gallons per 1,000 square feet at intervals of five to thirty days for about three months. This will serve to kill any weeds that may be present and prevent the growth of other weeds.

The salts are preferably prepared by using equal molar proportions of an aryl mercury salt, preferably of an organic acid, and either 2,4-dichlorophenoxy acetic acid, 2,5-dichlorophenoxy acetic acid, or 2,4,5-trichlorophenoxy acetic acid.

The new salts are preferably used in conjunction with boric acid and with an alkanolamine such as an ethanolamine. These materials make the solutions of the salt more stable and increases their potency. The boric acid and alkanolamine are preferably used in such concentrations that there is at least one-third molar weight of the boric acid to each hydroxyl equivalent weight of the amine. It is believed that the boric acid and the alkanolamine react to form an alkanolamine borate. The boric acid and alkanolamine may be used in any concentration desired with relation to the weed killing salts so as to provide an excess of one or the other. It is preferred, however, that the concentration be approximately two moles of alkanolamine borate ester to one mole of the aryl mercury salt.

When the aryl mercury salt is used in solution in combination with boric acid and an alkanolamine, it is preferred that the solution have a pH of from about 7.0 to 9.5. If the pH is within this range, the solution is more stable. Excellent stability has been obtained when the pH is within the range of between 7 and 8 and consequently this is the preferred range. In actual practice a pH as near 7.5 as possible is desired.

The new salts can be prepared by mixing the above aryl mercury compound and the acid in the cold. When these reactants are permitted to stand under ordinary atmospheric conditions and at room temperature the new salt is formed in a matter of two or three days. This reaction takes place either in the container in which the reactants are mixed or after the reactants have been applied to the weeds if the reactants are applied to the weeds before the reaction in the container has gone to completion.

The following examples illustrate the invention:

*Example I.*—One mol of 2,4-dichlorophenoxy acetic acid was mixed into one mol of phenylmercuric acetate to form the phenylmercuric salt of 2,4-dichlorophenoxy acetic acid. This compound was then dissolved in ethyl alcohol to provide a solution that could be used for weed killing.

*Example II.*—One mol of 2,4-dichlorophenoxy acetic acid was mixed into one mol of phenylmercuric acetate to form the phenylmercuric salt of 2,4-dichlorophenoxy acetic acid. This was then mixed with the reaction product prepared by warming ⅓ mol of boric acid with one mol of monoethanolamine until the boric acid is completely dissolved. The mixture was then dissolved in ethyl alcohol to provide a solution that could be used for weed killing.

*Example III.*—The same procedure as in Example I was followed but here the acid compound was 2,5-dichlorophenoxy acetic acid.

*Example IV.*—The same procedure as in Example I was followed except that here the acid was 2,4,5-trichlorophenoxy acetic acid.

In any of the above examples any of the chlorophenoxy acids may be used in place of the one specifically mentioned.

Although the aryl mercury salt is preferably reacted with the acid in approximately equal molar proportions, more or less of either of the reacting materials may be used to provide an excess of that material, if desired.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of killing weeds in an active state of growth which comprises applying thereto a herbicidal quantity of an aryl mercury salt of an acid of the class consisting of 2,4-dichlorophenoxy acetic acid, 2,5-dichlorophenoxy acetic acid, and 2,4,5-trichlorophenoxy acetic acid.

2. The method of killing weeds in an active state of growth which comprises applying thereto a herbicidal quantity of an aryl mercury salt of an acid of the class consisting of 2,4-dichlorophenoxy acetic acid, 2,5-dichlorophenoxy acetic acid, and 2,4,5-trichlorophenoxy acetic acid in a carrier.

3. The method of claim 2 wherein the carrier is a solvent for the salt.

4. The method of claim 2 wherein the carrier is a water-soluble solvent for the salt and water.

5. The method of claim 2 wherein the carrier is an inert powder.

6. The method of killing weeds in an active state of growth which comprises applying thereto a herbicidal quantity of a solution comprising an aryl mercury salt of an acid of the class consisting of 2,4-dichlorophenoxy acetic acid, 2,5-dichlorophenoxy acetic acid, and 2,4,5-trichlorophenoxy acetic acid, boric acid and an alkanolamine.

7. The method of killing weeds in an active state of growth which comprises applying thereto a herbicidal quantity of a solution comprising an aryl mercury salt of an acid of the class consisting of 2,4-dichlorophenoxy acetic acid, 2,5-dichlorophenoxy acetic acid, and 2,4,5-trichlorophenoxy acetic acid, boric acid and an alkanolamine said solution having a pH from about 7.0 to 9.5.

8. The method of killing weeds in an active state of growth which comprises applying thereto a herbicidal quantity of a solution comprising an aryl mercury salt of an acid of the class consisting of 2,4-dichlorophenoxy acetic acid, 2,5-dichlorophenoxy acetic acid, and 2,4,5-trichlorophenoxy acetic acid, boric acid, an alkanolamine, a water-soluble solvent and water, said solution having a concentration of about one part of said salt per 1,000 to 80,000 parts of combined water-soluble solvent and water.

9. The method of claim 8 wherein the solution has a pH of from about 7.0 to 9.5.

10. The method of killing weeds in an active state of growth which comprises applying thereto a herbicidal quantity of a solution comprising an aryl mercury salt of an acid of the class consisting of 2,4-dichlorophenoxy acetic acid, 2,5-dichlorophenoxy acetic acid, and 2,4,5-trichlorophenoxy acetic acid, boric acid, and alkanolamine, said amine and said boric acid being present in a ratio of at least one-third molar weight of the acid to each hydroxyl equivalent weight of the amine.

11. A composition comprising an aryl mercury salt of an acid of the class consisting of 2,4-dichlorophenoxy acetic acid, 2,5-dichlorophenoxy acetic acid, and 2,4,5-trichlorophenoxy acetic acid, boric acid and an alkanolamine.

12. A composition comprising an aryl mercury salt of an acid of the class consisting of 2,4-dichlorophenoxy acetic acid, 2,5-dichlorophenoxy acetic acid, and 2,4,5-trichlorophenoxy acetic acid, boric acid and an alkanolamine, said amine and said boric acid being present in a ratio of at least one-third molar weight of the acid to each hydroxyl equivalent weight of the amine.

13. A composition comprising an aryl mercury salt of an acid of the class consisting of 2,4-dichlorophenoxy acetic acid, 2,5-dichlorophenoxy acetic acid, and 2,4,5-trichlorophenoxy acetic acid, boric acid, an alkanolamine, and a carrier.

14. The composition of claim 13 wherein the carrier is a solvent.

15. The composition of claim 13 wherein the carrier is a water-soluble solvent and water.

16. A composition comprising an aryl mercury salt of an acid of the class consisting of 2,4-dichlorophenoxy acetic acid, 2,5-dichlorophenoxy acetic acid, and 2,4,5-trichlorophenoxy acetic acid, and a carrier therefor, said salt being present in a concentration of about 1 part of the salt per 1,000 to 80,000 parts of said carrier.

17. The composition of claim 16 wherein said carrier comprises a liquid.

18. The composition of claim 16 wherein said carrier comprises a solid.

PAUL A. SARTORETTO.

REFERENCES CITED

The following references are of record in the file of this patent:

UNITED STATES PATENTS

| Number | Name | Date |
|---|---|---|
| 1,943,540 | Kharasch | Jan. 16, 1934 |
| 2,062,823 | Ralston et al. | Dec. 1, 1936 |
| 2,181,098 | Perkins | Nov. 21, 1939 |
| 2,209,905 | Ralston | July 30, 1940 |
| 2,228,262 | Engels et al. | Jan. 14, 1941 |
| 2,390,941 | Jones | Dec. 11, 1945 |
| 2,422,951 | Conant | June 24, 1947 |